United States Patent
Lin et al.

(10) Patent No.: US 9,076,374 B2
(45) Date of Patent: Jul. 7, 2015

(54) DISPLAY DEVICE AND DRIVING METHOD APPLICABLE THERETO

(75) Inventors: Li-Tang Lin, Hsinchu (TW); Chia-Hung Lin, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 492 days.

(21) Appl. No.: 13/420,590

(22) Filed: Mar. 14, 2012

(65) Prior Publication Data

US 2012/0235978 A1   Sep. 20, 2012

(30) Foreign Application Priority Data

Mar. 15, 2011   (TW) .............................. 100108823 A (51) Int. Cl.
- *G06F 3/038* (2013.01)
- *G09G 3/20* (2006.01)
- *G06F 1/32* (2006.01)

(52) U.S. Cl.
CPC .......... *G09G 3/20* (2013.01); *G09G 2310/0289* (2013.01); *G06F 3/038* (2013.01); *G09G 2310/06* (2013.01); *G06F 1/3265* (2013.01); *G09G 2310/0275* (2013.01); *G09G 2310/08* (2013.01); *G09G 2330/021* (2013.01)

(58) Field of Classification Search
USPC ........................................... 345/212, 99, 208
See application file for complete search history.

(56) References Cited

U.S. PATENT DOCUMENTS

| | | | |
|---|---|---|---|
| 6,697,038 B2* | 2/2004 | Morii | 345/96 |
| 7,079,104 B2* | 7/2006 | Kumagai et al. | 345/98 |
| 2002/0067331 A1* | 6/2002 | Takabayashi et al. | 345/99 |
| 2003/0103028 A1 | 6/2003 | Kumagai et al. | |
| 2004/0189681 A1* | 9/2004 | Itakura et al. | 345/698 |
| 2005/0206604 A1* | 9/2005 | Washio et al. | 345/98 |
| 2007/0242027 A1* | 10/2007 | Ueda | 345/100 |
| 2008/0068360 A1* | 3/2008 | Fukuo | 345/204 |
| 2008/0094343 A1* | 4/2008 | Osame et al. | 345/99 |
| 2011/0063270 A1* | 3/2011 | Minami | 345/208 |

FOREIGN PATENT DOCUMENTS

CN   1287345 C   11/2006

* cited by examiner

*Primary Examiner* — Srilakshmi Kumar
(74) *Attorney, Agent, or Firm* — Rabin & Berdo, P.C.

(57) ABSTRACT

A driving method applicable to a display device including multiple display driving circuits, includes: the display driving circuits synchronously receiving a start pulse and generating a synchronous timing signal; a previous display driving circuit sending out a first signal to a rear display driving circuit, so that the rear display driving circuit detects and stores a signal reception delay, the display reception delay denoting a delay between the synchronous timing signal and the first signal received by the rear display driving circuit; after storing the display reception delay, the rear display driving circuit temporarily stopping receiving a system clock signal and temporarily stopping generating the synchronous timing signal; and the previous display driving circuit sending a second X signal to the rear display driving circuit to wake up the rear display driving circuit for preparing to receive a display data.

10 Claims, 5 Drawing Sheets

DISPLAY DEVICE AND DRIVING METHOD APPLICABLE THERETO

This application claims the benefit of Taiwan application Serial No. 100108823, filed Mar. 15, 2011, the disclosure of which is incorporated by reference herein in its entirety.

BACKGROUND

1. Technical Field

The disclosure relates in general to a display device and a driving method applicable thereto, and more particularly to a display device and a driving method applicable thereto in which the display driving circuit not receiving effective display data is temporarily turned off, and before receiving data, the display driving circuits resume the normal mode for preparing the synchronous timing signal to receive display data.

2. Background

A flat display may include multiple display driving circuits (such as source driving circuits). In the flat display with multiple display driving circuits, most of the display driving circuits receive a system clock signal and generate and maintain a synchronous timing signal during most of the operating time, so that the display driving circuits can maintain timing synchronicity to avoid data miss or wrong data fetch. However, during most of the operating time, most of the display driving circuits do not really receive the display data. Here, the display driving circuits receive the display data for driving a display panel (not illustrated) of the display device. Since the system still has to provide power to the display driving circuits not receiving the display data, the power consumption of the system cannot be reduced.

Figure 1:
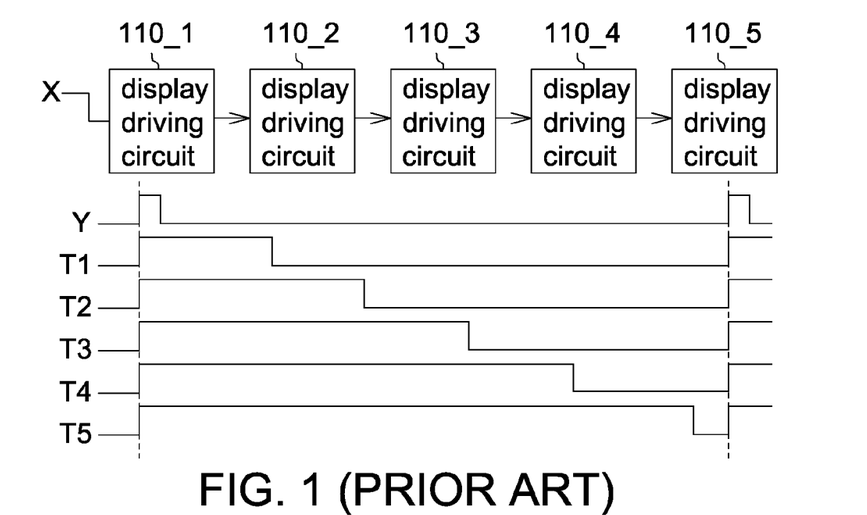
FIG. 1 (PRIOR ART) shows a prior driving timing diagram of display driving circuits.

Referring to FIG. 1, a prior driving timing diagram of display driving circuits is shown. Suppose the display having five display driving circuits 110_1~110_5. The actual operating period T of each display driving circuit must be long enough until all display data have been received by the display driving circuit. The designations T1~T5 respectively denote the actual operating periods of the five display driving circuits 110_1~110_5. The signal X denotes a signal which controls the display driving circuit to receive data, and Y denotes a start pulse. The signal Y is delivered to the first display driving circuit 110_1 by a timing controller (not illustrated) to inform when to start to receive the display data. A previous display driving circuit generates the signal X and delivers to the rear display driving circuit. The signal Y is delivered to all display driving circuits when the frame starts.

Within the period T1, the display driving circuit 110_1 receives a display data, and the display driving circuits 110_2~110_5 despite not receiving the display data still have to generate a synchronous timing signal. Likewise, within the period T2, the display driving circuit 110_1 may be turned off (because it already receives the required display data), the display driving circuit 110_2 starts to receive a display data, and the display driving circuits 110_3~110_5 despite not receiving the display data still have to generate the synchronous timing signal. Thus, the display driving circuits at the rear (that is, the display driving circuit(s) farther away form the timing controller, such as the display driving circuit 110_5) waste more power on maintaining the synchronous timing signal.

Within a frame period, each display driving circuit receives the display data for a short period of time but receives the system clock signal for the entire frame period, and this is another factor causing extra power consumption.

SUMMARY OF THE DISCLOSURE

The disclosure is directed to a display device and a driving method applicable thereto. A real X signal and a wake-up signals are delivered through X (input/output data) signal lines between a plurality of display driving circuits, so that the display driving circuit not receiving effective display data is temporarily turned off, and before receiving data, the display driving circuits resume the normal mode for preparing synchronous timing signal to receive a display data.

According to an exemplary example of the disclosure, a driving method applicable to a display device including multiple display driving circuits is provided. The driving method includes: synchronously receiving a start pulse and generating a synchronous timing signal by the display driving circuits; delivering a first signal from a previous display driving circuit to a rear display driving circuit, so that the rear display driving circuit accordingly detects and stores a signal reception delay denoting a delay between the synchronous timing signal and the first signal received by the rear display driving circuit; entering a temporary off mode for temporarily stopping receiving a system clock signal and temporarily stopping generating the synchronous timing signal by the rear display driving circuit after storing the signal reception delay in the rear display driving circuit; delivering a second signal from the previous display driving circuit to the rear display driving circuit to wake up the rear display driving circuit; resuming receiving the system clock signal by the rear display driving circuit; re-generating the synchronous timing signal by the rear display driving circuit for preparing to receive a display data.

According to another exemplary example of the disclosure, a display device is provided. The display device includes a plurality of cascaded display driving circuits. The display driving circuits synchronously receive a start pulse and generate a synchronous timing signal. A previous display driving circuit of the display driving circuits delivers a first signal to a rear display driving circuit of the display driving circuits, so that the rear display driving circuit accordingly detects and stores a signal reception delay, the signal reception delay denoting a delay between the synchronous timing signal and the first signal received by the rear display driving circuit. After storing the signal reception delay, the rear display driving circuit enters a temporary off mode for temporarily stopping receiving a system clock signal and for temporarily stopping generating the synchronous timing signal. The previous display driving circuit delivers a second signal to the rear display driving circuit to wake up the rear display driving circuit. The rear display driving circuit resumes receiving the system clock signal. The rear display driving circuit re-generates the synchronous timing signal for preparing to receive a display data.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

First Embodiment

Figure 2:
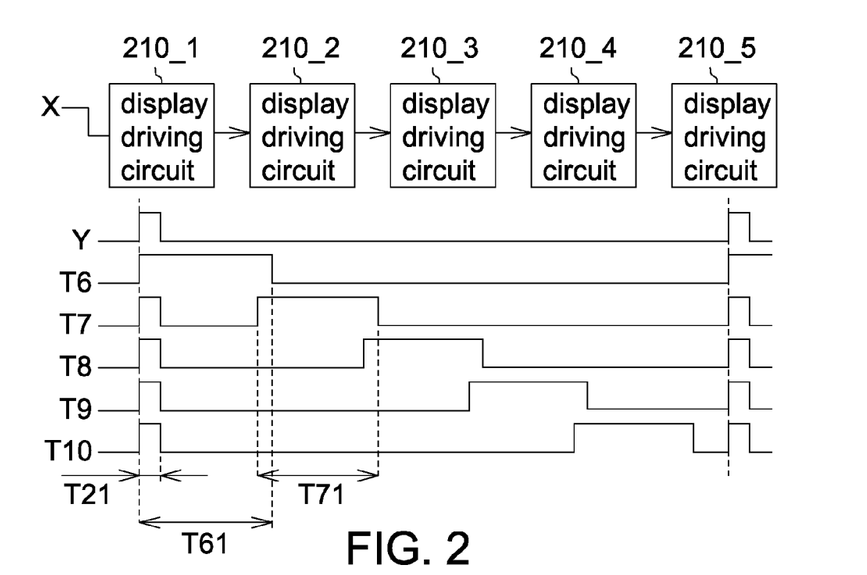
FIG. 2 shows a driving timing diagram of display driving circuits according to a first embodiment of the disclosure.
Figure 3:
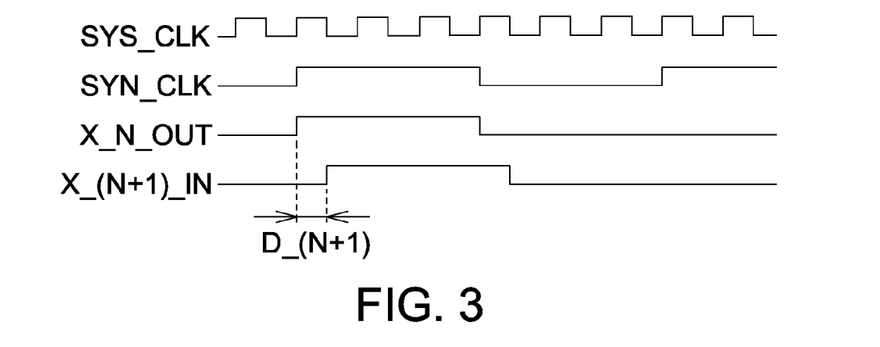
FIG. 3 shows a signal reception delay D according to the first embodiment of the disclosure.

FIG. 2 shows a driving timing diagram of display driving circuits 210_1~210_5 according to a first embodiment of the disclosure. The designations T6~T10 respectively denote actual operating periods of the five display driving circuits 210_1~210_5. Due to the signal tracing among the display driving circuits 210_1~210_5, a delay occurs between sending a signal from the previous display driving circuit and receiving of the signal by the next display driving circuit, as indicated in FIG. 3. In FIG. 3, the designation SYS_CLK denotes a system timing (clock) signal, the designation SYN_CLK denotes a synchronous timing signal, the designation X_N_OUT denotes an X signal delivered from the N-th display driving circuit, the designation X_(N+1)_IN denotes an X signal received by the (N+1)-the display driving circuit, the designation D_(N+1) denotes a signal reception delay of the (N+1)-the display driving circuit. That is, the designation D_(N+1) denotes a delay between receiving of the X signal by the (N+1)-th display driving circuit and receiving of the synchronous timing signal SYN_CLK by the (N+1)-th display driving circuit. In the present embodiment of the disclosure, within the timing T21, the display driving circuits 210_1~210_5 synchronously generate an X signal and deliver the X signal. Each display driving circuit calculates its own signal reception delay D and stores the delay D. In the present embodiment of the disclosure, the delay D is considered, so that the synchronous timing signals SYN_CLK generated by the display driving circuits are synchronized.

Figure 4:
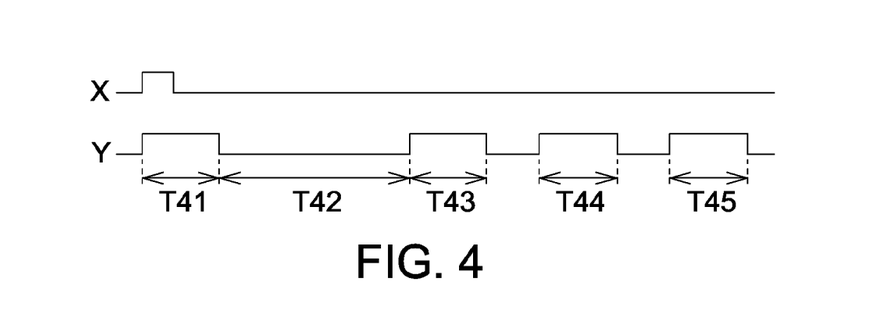
FIG. 4 shows a signal timing diagram on an X signal line between a previous display driving circuit and a next display driving circuit according to a first embodiment of the disclosure.

Referring to both FIG. 2 and FIG. 4. FIG. 4 shows a signal timing diagram of an X signal line between a previous display driving circuit and a next display driving circuit according to the first embodiment of the disclosure. Within the timing T41, the display driving circuit 210_1 delivers an X signal to the display driving circuit 210_2, so that the display driving circuit 210_2 calculates and stores its own signal reception delay D (the timing T41 is the timing T21 of FIG. 2). After T41, the display driving circuit 210_2 is allowed to enter a temporary off mode to save power consumption (that is, the display driving circuit 210_2 does not receive the system clock signal SYS_CLK or the display data and does not generate the synchronous timing signal SYN_CLK) as indicated at timing T42. The display driving circuit 210_1 delivers a wake-up signal (at timing T43) to wake up a next display driving circuit 210_2 through an X signal line so that the next display driving circuit 210_2 receives the system clock signal SYS_CLK again. Then, the display driving circuit 210_1 delivers an X signal (at timing T44) through the X signal line so that the next display driving circuit 210_2 re-generates the synchronous timing signal SYN_CLK. The display driving circuit 210_1 delivers a real X signal (timing T45) through the X signal line to inform the next display driving circuit 210_2 when to start to receive the display data.

For the display driving circuits 210_1~210_5 of FIG. 2, the timing T41 of FIG. 4 is totally within the period T21, that is, T41 is shorter than T21, but the disclosure and is not limited thereto. For example, T41 may be longer than, shorter than or equal to T21, which are still within the spirit of the disclosure. Let the display driving circuit 210_2 be taken for example. The timings T42~T45 of FIG. 4 are within the period T71.

Figure 5:
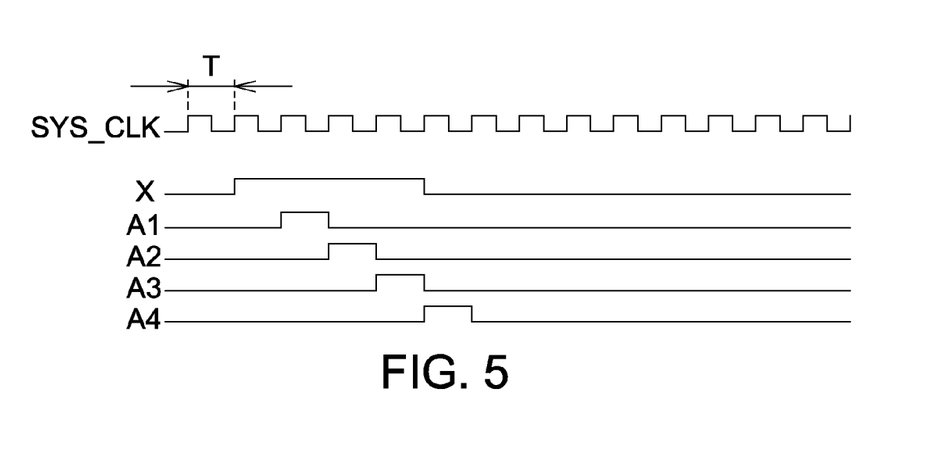
FIG. 5 shows how a signal reception delay D is detected and stored according to the first embodiment of the disclosure.

The details for detecting and storing the signal reception delay D are disclosed below. However, the disclosure and is not limited thereto. Let the width of the X signal be 4T and the display data be an 8-bit data. Referring to FIG. 5, signals A1~A4 are used for detecting the X_(N)_IN, wherein X_(N)_IN is an X signal received by the N-th display driving circuit. The range of D may be obtained and then stored based on a judgment result on the signals A1~A4. For example, if the X_(N)_IN signal is detected within the period when the signal A1 is at high level, this implies that D=0~1T, and parameters B1~B4 may be set as B1=1, B2=B3=B4=0 for example but such example is non-limiting. If the X_(N)_IN signal is detected within the period when the signal A2 is at high level, this implies that D=1~2T, and parameters B1~B4 may be set as B2=1, B1=B3=B4=0 for example but such example is non-limiting. If the X_(N)_IN signal is detected within the period when the signal A3 is at high level, this implies that D=2~3T, and parameters B1~B4 may be set as B3=1, B1=B2=B4=0 for example but such example is non-limiting. If the X_(N)_IN signal is detected within the period when the signal A4 is at high level, this implies that D=3~4T, and parameters B1~B4 may be set as B4=1, B1=B2=B3=0 for example but such example is non-limiting.

Thus, the signal reception delay D of the display driving circuit may be obtained and stored. The display driving circuit is allowed to enter a temporary off mode, in which the display driving circuit neither receives the system clock signal nor generates the synchronous timing signal.

The details of re-generating the synchronous timing signal by the display driving circuit after entering the temporary off mode are disclosed below. Since the signal reception delay D is already detected and stored, the next display driving circuit may re-generate the synchronous timing signal SYN_CLK through the X signal delivered from the previous display driving circuit (timing T44 of FIG. 4) so that the display driving circuit may resume the normal state before receiving the display data.

Figure 6:
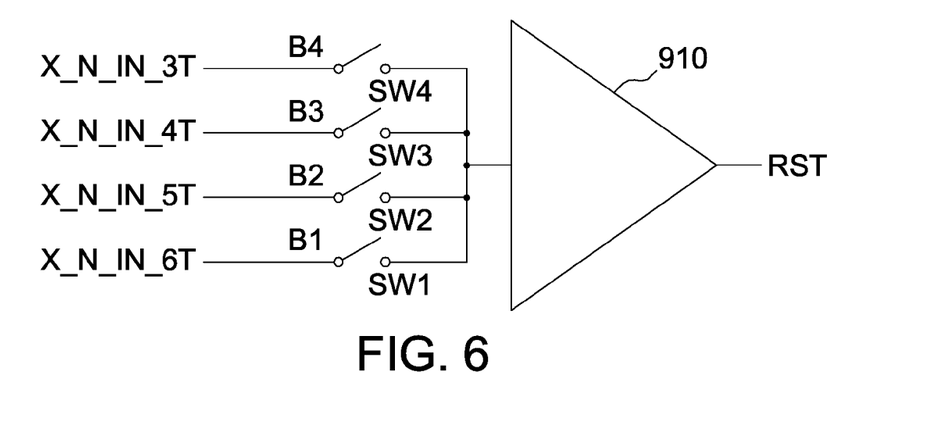
FIGS. 6~7 show how a synchronous timing signal SYN_CLK is re-generated according to the first embodiment of the disclosure.
Figure 7:
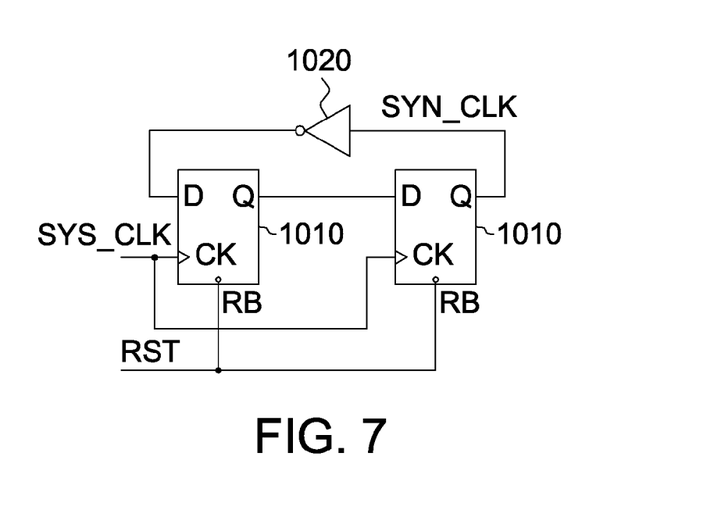

FIGS. 6~7 show how the synchronous timing signal SYN_CLK is re-generated according to the first embodiment of the disclosure. The X_N_IN delivered from the previous display driving circuit is delayed for 1T~7T. In FIG. 6, the X_N_IN_3T is obtained by delaying the signal X_N_IN for 3T periods, and the rest may be obtained by analogy. The signals B1~B4 respectively control switches SW1~SW4 for inputting one of the X_N_IN_3T~X_N_IN_6T to an operation amplifier 910 to generate a triggering signal RST, which triggers the D-type flip-flop 1010 of FIG. 7 to re-generate a correct synchronous timing signal SYN_CLK. As indicated in FIG. 7, the synchronous timing signal SYN_CLK is feedback to the D-type flip-flop 1010 through the inverter 1020.

Figure 8:
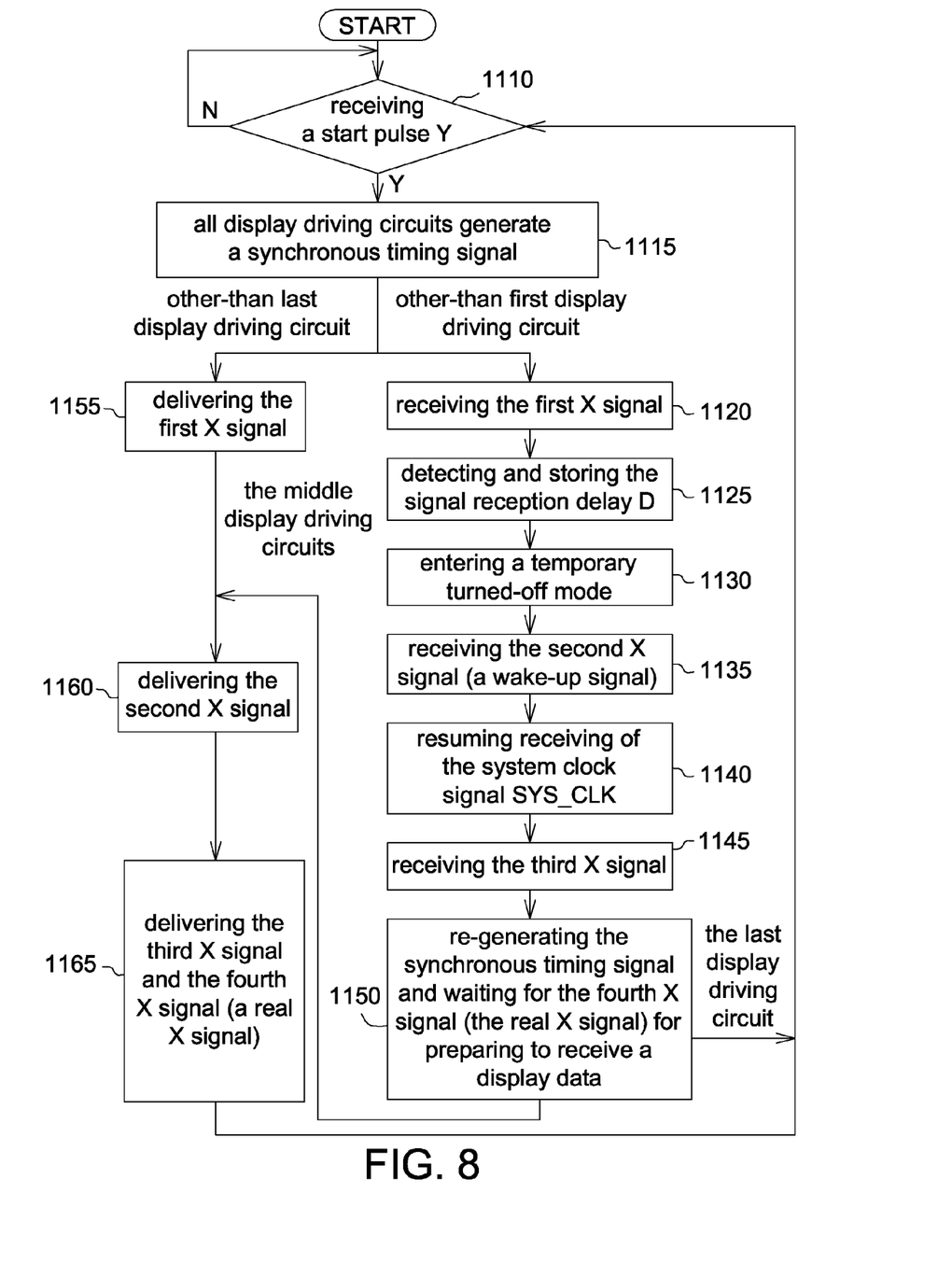
FIG. 8 shows an operation flowchart for the display driving circuits according to the first embodiment of the disclosure.

Referring to FIG. 8, an operation flowchart for the display driving circuits according to the first embodiment of the disclosure is shown. As indicated in step 1110 of FIG. 8, whether all display driving circuits receive the start pulse Y is determined. Basically, all display driving circuits synchronously receive the start pulse Y. All display driving circuits respectively generate the synchronous timing signal SYN_CLK as indicated in step 1115. The other-than first display driving circuits (in the example of FIG. 2, the other-than first display driving circuits refer to the display driving circuits 210_2~210_5, i.e. the rear display driving circuits) perform steps 1120~1150, and the other-than last display driving circuits (in the example of FIG. 2, the other-than last display driving circuits refer to the display driving circuits 210_1~210_4) perform steps 1155~1165.

In step 1120, the other-than first display driving circuits 210_2~210_5 receive the first X signal from a previous display driving circuit. In step 1125, the other-than first display driving circuits 210_2~210_5 detect and store the signal reception delay D according to the received first X signal and the received synchronous timing signal SYN_CLK, wherein the signal reception delay D denotes a delay between the received first X signal and the synchronous timing signal SYN_CLK. In step 1130, the other-than first display driving circuits 210_2~210_5 enter a temporary turned-off mode (in the temporary turned-off mode, the display driving circuit stops receiving the system clock SYS_CLK and stops generating the synchronous timing signal SYN_CLK). In steps 1135 and 1140, if the other-than first display driving circuits 210_2~210_5 receive a second X signal (wake-up signal) from a previous display driving circuit, then the other-than first display driving circuits 210_2~210_5 resume receiving the system clock signal SYS_CLK. In step 1145 and 1150, if the other-than first display driving circuits 210_2~210_5 receive a third X signal from a previous display driving circuit, then the other-than first display driving circuits 210_2~210_5 re-generate the synchronous timing signal according to the signal reception delay D (this implies that the other-than first display driving circuits 210_2~210_5 in the temporary-off mode have resumed the normal mode) and wait for a fourth X signal (which informs the rear display driving circuit when to receive the display data) delivered from a previous display driving circuit for preparing to receive the display data (for example, the display data is delivered from the timing controller).

After step 1150, the last display driving circuit 210_5 returns to step 1110, the middle display driving circuits 210_2~210_4 (referring to the display driving circuits neither the first display driving circuit 210_1 nor the last display driving circuit 210_5) proceed to step 1160.

In step 1155, after all display driving circuits generate the synchronous timing signal SYN_CLK, the other-than last display driving circuits 210_1~210_4, i.e. the previous display driving circuits, deliver the first X signal to a respective subsequent display driving circuit, so that the subsequent display driving circuit detects and stores the signal reception delay D accordingly. In step 1160, the other-than last display driving circuits 210_1~210_4 deliver the second X signal to a respective subsequent display driving circuit to wake up the respective subsequent display driving circuit. In step 1165, the other-than last display driving circuits 210_1~210_4 deliver the third X signal to a respective subsequent display driving circuits so that the respective subsequent display driving circuit may re-generate the synchronous timing signal SYN_CLK, and the other-than last display driving circuits 210_1~210_4 deliver the fourth X signal (a real X signal) to a respective subsequent display driving circuits to inform the respective subsequent display driving circuit when to start to receive the display data.

In addition, the display driving circuit of the first embodiment of the disclosure has another operating flowchart, which is different from FIG. 8 in that all display driving circuits perform steps 1155~1165 but the other-than first display driving circuits still perform steps 1120~1150. However, in FIG. 8, the other-than last display driving circuits still perform step 1155~1165, that is, the last display driving circuit does not perform steps 1155~1165.

In addition, the display driving circuit of the first embodiment of the disclosure has further another operating flowchart, which is different from FIG. 8 in that all display driving circuits perform steps 1120~1165. It is noted that in FIG. 8, the other-than last display driving circuits perform steps 1155~1165 (that is, the last display driving circuit does not perform steps 1155~1165), but the other-than first display driving circuits perform steps 1120~1150 (that is, the first display driving circuit does not perform steps 1120~1150).

Second Embodiment

Figure 9:
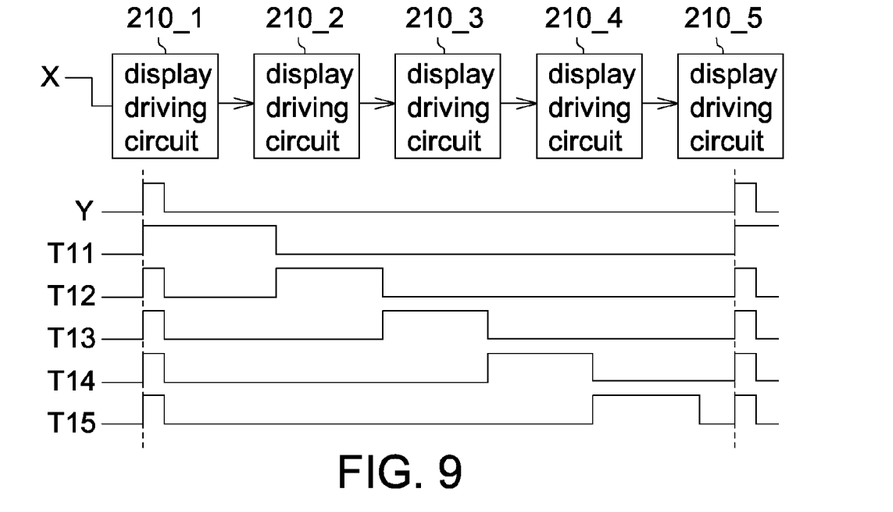
FIG. 9 shows a driving timing diagram of display driving circuits according to a second embodiment of the disclosure.

FIG. 9 shows a driving timing diagram for the display driving circuits 210_1~210_5 according to a second embodiment of the disclosure. The designations T11~T15 respectively denote actual operating periods of the five display driving circuits 210_1~210_5. The second embodiment is different from the first embodiment in that in the second embodiment, the previous display driving circuit does not need to deliver the third X signal (the signal delivered at timing T44 of FIG. 4) to the rear display driving circuit. That is, after receiving the wake-up signal from the previous display driving circuit, the rear display driving circuit receives the real X signal (to inform the rear display driving circuit when to start to receive the display data) from a previous display driving circuit, and the rear display driving circuit accordingly generates the synchronous timing signal SYN_CLK.

In the second embodiment, it is identified in advance that after the rear display driving circuit receives the wake-up signal, how long does the rear display driving circuit needs to be ready for receiving the signal. So, the previous display driving circuit may estimate when to deliver the second X signal before delivering the real X signal.

Third Embodiment

Figure 10:
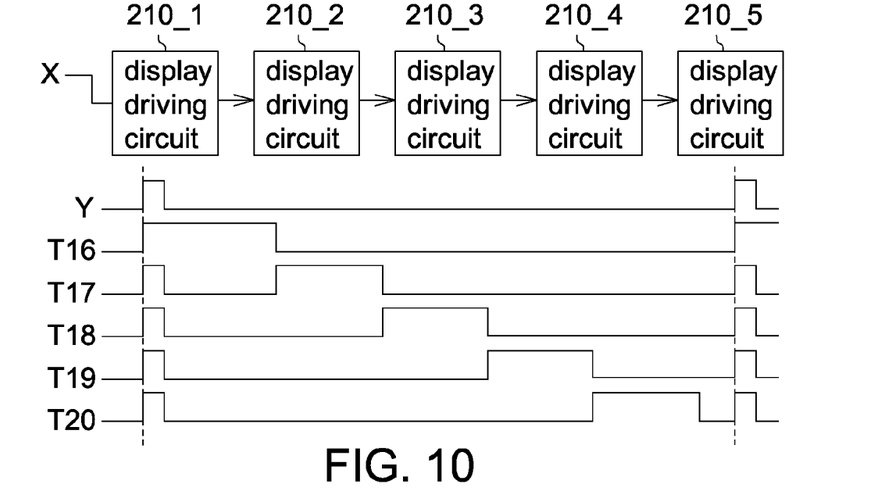
FIG. 10 shows a driving timing diagram of display driving circuits according to a third embodiment of the disclosure.

FIG. 10 shows a driving timing diagram for the display driving circuits 210_1~210_5 according to a third embodiment of the disclosure. The designations T16~T20 respectively denote actual operating periods of the five display driving circuits 210_1~210_5. The third embodiment is different from the first embodiment in that the third embodiment, the previous display driving circuit does not need to deliver the third X and the fourth X signal (the signal delivered at timings T44 and T45 of FIG. 4) to the rear display driving circuit. That is, after receiving the wake-up signal from the previous display driving circuit, the rear display driving circuit is awakened to re-generate the timing signal SYN_CLK, and the rear display driving circuit identifies the timing of the real X signal based on the second X signal, so that the rear display driving circuit starts to receive data correctly.

Thus, in the third embodiment, it is identified in advance that after the rear display driving circuit receives the wake-up signal, how long does the rear display driving circuit needs to be ready for receiving the signal. So, the previous display driving circuit may estimate the pulse width of the second X signal and containing the real X signal in the second X signal.

As disclosed above, one skilled in the art would understand how to adapt the first embodiment to be applicable to the second and the third embodiments, and the details are not repeated here.

In the above embodiments, the first display driving circuit 210_1 receives the signal X, but in other possible embodiments, the first display driving circuit 210_1 may not receive the signal X, which is still within the spirit of the disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A driving method applicable to a display device including a plurality of display driving circuits, including:

synchronously receiving a start pulse and generating a synchronous timing signal by the display driving circuits;

delivering a first signal from a previous display driving circuit to a rear display driving circuit, so that the rear display driving circuit accordingly detects and stores a signal reception delay denoting a delay between the synchronous timing signal and the first signal received by the rear display driving circuit;

temporarily stopping receiving a system clock signal and temporarily stopping generating the synchronous timing signal by the rear display driving circuit after storing the signal reception delay in the rear display driving circuit; and delivering a second signal from the previous display driving circuit to the rear display driving circuit to wake up the rear display driving circuit for preparing to receive a display data; wherein, the rear display driving circuit receives the first signal from the previous display driving circuit;

the rear display driving circuit accordingly detects and stores the signal reception delay according to the received first signal and the synchronous timing signal;

after the rear display driving circuit temporarily stops receiving the system clock signal and temporarily stops generating the synchronous timing signal, the rear display driving circuit resumes receiving the system clock signal if the rear display driving circuit receives the second signal;

the rear display driving circuit re-generates the synchronous timing signal according to the signal reception delay if the rear display driving circuit receives a third signal from the previous display driving circuit; and the rear display driving circuit receives a fourth signal from the previous display driving circuit for preparing to receive the display data.

2. The driving method according to claim 1, wherein, the step of waking up the rear display driving circuit for preparing to receive the display data comprises:

receiving the second signal by the rear display driving circuit to resume receiving the system clock signal;

receiving the third signal by the rear display driving circuit to re-generate the synchronous timing signal; and receiving the fourth signal by the rear display driving circuit for preparing to receive the display data.

3. The driving method according to claim 1, wherein, the step of waking up the rear display driving circuit for preparing to receive the display data comprises:

after receiving the second signal from the previous display driving circuit, receiving a real signal from the previous display driving circuit by the rear display driving circuit to inform the rear display driving circuit when to start to receives the display data and the rear display driving circuit accordingly resumes receiving the system clock signal and re-generates the synchronous timing signal.

4. The driving method according to claim 1, wherein, after the display driving circuits generate the synchronous timing signal, the previous display driving circuit delivers the first signal to the rear display driving circuit, so that the rear display driving circuit accordingly detects and stores the signal reception delay;

the previous display driving circuit delivers the second signal to the rear display driving circuit to wake up the rear display driving circuit;

the previous display driving circuit delivers the third signal to the rear display driving circuit so that the rear display driving circuit re-generates the synchronous timing signal; and the previous display driving circuit delivers the fourth signal to the rear display driving circuit to inform the rear display driving circuit when to start to receive the display data.

5. The driving method according to claim 1, wherein, after the display driving circuits generate the synchronous timing signal, the display driving circuits deliver the first signal to the rear display driving circuit, so that the rear display driving circuit accordingly detects and stores the signal reception delay;

the display driving circuits deliver the second signal to the rear display driving circuit to wake up the rear display driving circuit;

the display driving circuits deliver the third signal to the rear display driving circuit so that the rear display driving circuit re-generates the synchronous timing signal; and the display driving circuits deliver the fourth signal to the rear display driving circuit to.

6. A display device, comprising:

a plurality of cascaded display driving circuits;

wherein the display driving circuits synchronously receive a start pulse and generate a synchronous timing signal;

a previous display driving circuit delivers a first signal to a rear display driving circuit, so that the rear display driving circuit accordingly detects and stores a signal reception delay denoting a delay between the synchronous timing signal and the first signal received by the rear display driving circuit;

after storing the signal reception delay, the rear display driving circuit temporarily stops receiving a system clock signal and temporarily stops generating the synchronous timing signal; and the previous display driving circuit delivers a second signal to the rear display driving circuit to wake up the rear display driving circuit for preparing to receive a display data; wherein, the rear display driving circuit receives the first signal from the previous display driving circuit;

the rear display driving circuit accordingly detects and stores the signal reception delay according to the received first signal and the synchronous timing signal;

after the rear display driving circuit temporarily stops receiving the system clock signal and temporarily stops generating the synchronous timing signal, the rear display driving circuit resumes receiving the system clock signal if the rear display driving circuit receives the second signal;

the rear display driving circuit re-generates the synchronous timing signal according to the signal reception delay if the rear display driving circuit receives a third signal from the previous display driving circuit; and the rear display driving circuit receives a fourth signal from the previous display driving circuit for preparing to receive the display data.

7. The display device according to claim 6, wherein, the rear display driving circuit receives the second signal to resume receiving the system clock signal;

the rear display driving circuit receives the third signal to re-generate the synchronous timing signal; and the rear display driving circuit receives the fourth signal for preparing to receive the display data.

8. The display device according to claim 6, wherein, after receiving the second signal from the previous display driving circuit, the rear display driving circuit receives a real signal from the previous display driving circuit to inform the rear display driving circuit when to start to receive the display data, and the rear display driving circuit accordingly resumes receiving the system clock signal and re-generates the synchronous timing signal.

9. The display device according to claim 6, wherein, after the display driving circuits generate the synchronous timing signal, the previous display driving circuit delivers the first signal to the rear display driving circuit, so that the rear display driving circuit accordingly detects and stores the signal reception delay;

the previous display driving circuit delivers the second signal to the rear display driving circuit to wake up the rear display driving circuit;

the previous display driving circuit delivers the third signal to the rear display driving circuit so that the rear display driving circuit re-generates the synchronous timing signal; and the previous display driving circuit delivers the fourth signal to the rear display driving circuit to inform the rear display driving circuit when to start to receive the display data.

10. The display device according to claim 6, wherein, after the display driving circuits generate the synchronous timing signal, the display driving circuits deliver the first signal to the rear display driving circuit, so that the rear display driving circuit accordingly detects and stores the signal reception delay;

the display driving circuits deliver the second signal to the rear display driving circuit to wake up the rear display driving circuit;

the display driving circuits deliver the third signal to the rear display driving circuit so that the rear display driving circuit re-generates the synchronous timing signal; and the display driving circuits deliver the fourth signal to the rear display driving circuit to inform the rear display driving circuit when to start to receive the display data.

* * * * *